Jan. 13, 1970  C. BERGER ET AL  3,489,610
BATTERY HAVING A POROUS INSOLUBLE HYDROUS
INORGANIC OXIDE SEPARATOR
Filed June 30, 1964

CARL BERGER
A. E. LEVY-PASCAL
DONALD H. McCLELLAND
INVENTORS

BY

ATTORNEY

United States Patent Office 3,489,610
Patented Jan. 13, 1970

3,489,610
BATTERY HAVING A POROUS INSOLUBLE
HYDROUS INORGANIC OXIDE SEPARATOR
Carl Berger, Corona Del Mar, Arie E. Levy-Pascal, Palo
Alto, and Donald H. McClelland, Newbury Park, Calif.,
assignors, by mesne assignments, to McDonnell Douglas Corporation, Santa Monica, Calif., a corporation
of Maryland
Filed June 30, 1964, Ser. No. 379,093
Int. Cl. H01m 3/02
U.S. Cl. 136—6                                   14 Claims This invention relates to batteries, particularly high energy density batteries, and is especially concerned with the provision of improved inorganic membranes or separators for use in batteries, and to improved battery construction embodying efficient inorganic separators having a porous internal structure and pore size characteristics preventing transfer of electrode ions such as zinc and silver ions through the separator.

Batteries are an important source of energy storage for power generation in air-borne systems. An important type of battery particularly suited for such applications are the high energy density alkaline electrolyte cells using such electrode combinations as silver-zinc, silver-cadmium and nickel-cadmium. High energy density batteries are generally battery systems which have a substantially higher energy per unit of weight than conventional, e.g., lead, storage batteries. Thus, high energy density batteries can develop, e.g., 100 to 140 watt hours of energy per pound. In addition to important air-borne applications, such high energy density batteries have many other applications such as in portable tools and appliances, television, radio and record players, engine starting, portable X-ray units and the like. However, batteries in use at the present time have not given sufficiently long life, nor have they been able to operate at the extremes of high and low temperatures.

In high energy density batteries such as silver-zinc, nickel-cadmium, silver-cadmium, the separator performs the function of retaining electrolyte, e.g., potassium hydroxide, separating the electrodes, and preventing migration of electrode ions or growth of dendritic crystals of electrode ions which short circuit the battery. It has been known to employ organic separators in such batteries but these have several disadvantages. Thus, such organic separators are not chemically stable especially at temperatures above 50° C., they tend to swell excessively at elevated temperatures and most organics are not readily wetted by cautic solutions. Further, organics are not inert to silver oxide in caustic solutions and organic materials are generally soft and pliable and are subject to puncture by dendrite growth.

Some of the prinicipal objectives in battery development and also objects of the present invention, are to obtain a higher energy per unit weight, permit operation in a higher thermal environment, and increase the life of a battery both in stand-by and discharge-recharge cycling.

It is another object of this invention to provide improved high energy density batteries having extended periods of life and which are capable of operation at high temperatures of the order of about 100° C. and above, and to provide improved inorganic battery separators especially designed for use in such batteries.

Another object of the invention is the development of inorganic battery separators and improved battery constructions, particularly for silver-zinc, silver-cadmium, nickel-cadmium, and other high energy density battery systems, for operation at temperatures from ambient up to 100° to 200° C.

A further object of the invention is the design of a battery particularly suited for air-borne applications, of small weight, capable of being charged and discharged over a large number of cycles, and operating particularly at elevated temperatures, said batteries being capable of withstanding temperatures of the order of 100° C. and higher, and which can take advantage of increased electrochemical activity and decreased electrolyte resistance at such elevated temperatures.

A still further object is the design of batteries and inorganic battery separators which are chemically inert particularly at elevated temperatures, are geometrically stable, readily wetted by electrolyte, are not attacked by silver oxide, can be made with controlled porosity, and which resist puncture by dendritic growth.

A still further object is the provision of improved high energy density batteries, particularly silver-zinc cells, incorporating inorganic separators which are strong, rigid and capable of supporting electrodes of opposite polarity, yet having a porosity sufficient to permit transfer of hydroxyl ions through the separator but preventing penetration of the electrode ions into and through the separator.

Other objects and advantages will appear herinafter.

The present invention is based on the discovery that inorganic separators, particularly porous separators or membranes, and preferably composed of insoluble hydrous inorganic or metal axides such as hydrous zirconium oxides, have many advantages over the use of organic separators, in high energy density batteries. Thus, the inorganic separators of the invention are chemically inert at all operating temperatures and particularly at elevated temperatures, e.g., above 100° C. The porosity of such inorganic separators is easily controlled and can be varied to control resistance and diffusion of ions through the separator. Such separators have geometric stability, are readily wetted by alkaline electrolytes, and are not chemically attacked by silver oxide. Further, the rigid microporous structure of such inorganic separators does not allow dendrite growth through the separator.

It is a particular feature of the inorganic separators according to the invention that although such separators can be formed into thin, strong, rigid membranes, satisfactory porosity can be provided in such hydrous metal oxide separators by various procedures of formation described below, such that the separators permit and facilitate transfer of electrolyte ions through the separator, but prevent transfer of electrode ions such as silver and zinc ions through the separator so that no treeing of, for example, zinc dendrites can occur in the separator. Thus, maximum porosity should be about 40%, and minimum porosity about 5%, and hence the separators of the invention have a porosity in the range from about 5% to about 40%. Generally, porosity of the hydrous metal oxide separator of the invention can range from about 8% to about 40%, preferably from about 10% to about 25%, as measured by water absorption according to the expression:

$$\frac{\text{Weight after water saturation} - \text{dry weight}}{\text{dry weight}} \times 100$$

The inorganic separators according to the invention are quite thin, and can have a thickness, e.g., in the range of about .005 to about 0.050 inch.

If the porosity of the separators is greater than about 40%, the strength of the separators is reduced dangerously to a point where the separator is easily broken or shattered, especially during assembly of the battery, and is incapable of properly supporting the electrodes, and too porous to prevent electrode ion passage, and if the porsity is below about 5%, the effectiveness of the battery is materially and undesirably reduced due to the substantially reduced amount of electrolyte which can be retained by the separator, thereby preventing required diffusion of electrolyte ions.

A high energy density battery is accordingly provided according to the invention embodying an insoluble hydrous metal oxide separator generally having the porosity characteristics above indicated, in combination with electrodes of opposite polarity, e.g., zinc and silver electrodes, preferably in supported relation adjacent opposite sides of the separator. Such relatively rigid inorganic separator provides support for the electrodes even though the separator is very thin and has porous characteristics, as described above. These batteries, in addition to having long cycle life at elevated temperatures, have exhibited excellent charging efficiency under severe operating conditions.

By the terms "porous membrane" and "porous separator" employed herein, is intended to denote a membrane-thin plate, latticework, network or matrix having an inner structure of interconnecting micropores between its opposing surfaces.

The insoluble porous hydrous metal oxide membranes have properties and are particularly adapted to use in fuel cells and batteries where extremely strong membranes are required to maintain electrode ion separation between the electrodes of the battery or fuel cell, and wherein operating temperatures may approach and exceed 150° C. Moreover, the present invention has the distinct advantage of allowing membranes to be stored in an inert form for indefinite periods of time without change and to be employed as high strength porous membranes or separators for batteries as needed.

For the purposes of this invention, the term "insoluble hydrous metal oxides" includes those water insoluble materials containing one or more metal atoms, oxygen atoms, and an indeterminate quantity of water. The hydrous metal oxides do not necessarily have a definite stoichiometric combination or definite crystal structure and may contain ionic impurities. The water insoluble hydrous metal oxides which can be employed to form the separators of the invention are the water insoluble hydrous oxides of metals selected from the following groups of metals in the Periodic Table: III–A, III–B, IV–A, IV–B, V–A, V–B, VI–B, VII–B, VIII, the Lanthanide Series and the Actinide Series. The elements or metals forming insoluble hydrous oxides which are of greatest practical importance at the present time are: Al (III), Ga (III), In (III), Sc (III), Y (III), Zr (IV), Ti (IV), Hf (IV), Pb (II), Si (IV), Ge (IV), Sn (IV), Sb (III, V), Bi (III), As (V), V (V), Nb (V), Ta (V), Cr (III), Mo (IV, VI), W (IV, VI), Mn (IV), Re (IV), Tc (IV), Fe (III), Co (II), Ni (II), Ac (III), Th (III), U (IV, VI), Pu (IV), La (III), Ce (IV), and Yb (III). Other valence states of some of these elements may also be useful.

Materials which are particularly useful for producing inorganic separators according to the invention are the hydrous oxides of zirconium, titanium, antimony, tungsten, silicon, scandium, bismuth, vanadium, aluminum and cerium. Hydrous zirconium oxide separators are especially desirable.

Battery separators according to the invention can be prepared by various techniques. Thus, for example a separator can be prepared by (1) conversion of acid salts to the corresponding hydrous oxides, as described in the copending application Ser. No. 326,985, now Patent No. 3,346,422, filed Nov. 29, 1963, of Carl Berger, (2) flame spraying insoluble metal oxides accompanied by hydrolytic activation, as described in the copending applications Serial No. 327,114, now abandoned of Norman Michael and Ser. No. 327,038, now Patent No. 3,392,103, of Carl Berger, both filed Nov. 29, 1963, and (3) impregnating porous ceramics such as alumina or zirconia with a gel of an insoluble hydrous metal oxide such as hydrous zirconium oxide, as described in copending application Ser. No. 326,740, filed Nov. 29, 1963, of Carl Berger.

In method (1) noted above, an acid salt such as zirconium phosphate, can be treated with alkali, e.g., potassium hydroxide, to form hydrous zirconium oxide.

According to method (2) described above, metal oxide such as zirconia is flame-sprayed and the resulting anhydrous ceramic membrane is then treated with high temperature steam or with alkali, e.g., KOH, to partially rehydrate the base ceramic material to its hydrous state.

In procedure (3) noted above, a gel-filled membrane is formed by filling the pores of a strong porous thin plate, such as a ceramic plate, e.g., a flame-sprayed zirconia membrane, with insoluble hydrous metal oxide gel, e.g., a hydrous gel of zirconium oxide.

The descriptions of the above processes as described in the above copending applications are all incorporated herein by reference.

By the above-noted techniques, inorganic materials having excellent chemical resistance, good electrical resistivity and high strength can be formed into battery separators according to the invention. However, it is noteworthy that the hydrous metal oxides of which the invention separators are formed, provide less internal resistance than do sintered metal oxides, and such reduced internal resistance is a distinct advantage in producing efficient battery separators which have long cycle life, particularly for high energy density batteries. Further, the hydrous metal oxides hereof have ion exchange properties rendering such materials useful as ion exchange membranes in fuel cells.

By employing the procedures noted above, inorganic separators comprising hydrous metal oxides, particularly hydrous zirconium oxide, are readily produced and which have a controlled porosity within the ranges noted above. However, it will be understood that insoluble hydrous metal oxide membranes or separators produced by other procedures are also within the purview of the invention.

After formation of the hydrous oxide separator or membrane, electrodes are positioned on opposite surfaces or opposite sides of the separator. For this purpose the electrodes, e.g., zinc and silver electrodes, can be flame-sprayed onto opposite surfaces of the separator or the respective electrodes can be pressed against opposite surfaces of the separator. The hydrous metal oxide membrane can be impregnated with electrolyte, e.g., KOH, either before or after the electrodes are assembled on opposite sides of the separator. The entire assembly including the separator and the electrodes are then assembled or clamped together to form a battery. If desired, the entire assembly then can be encapsulated in an encapsulating resin. A variety of resins can be employed for this purpose, including epoxies, polyesters, phenolics, melamines, and silicones, epoxies being preferred. The resins are usually mixed with catalysts or hardeners, or both.

The invention will be further described in relation to sembly according to the invention;

Figure 1:
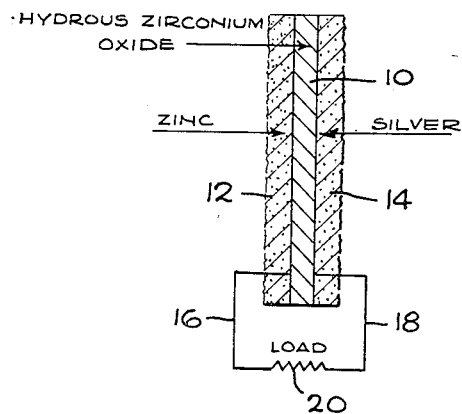
FIG. 1 is a schematic representation of a battery assembly according to the invention.

Referring to FIG. 1, an insoluble hydrous metal oxide membrane, e.g., hydrous zirconium oxide, represented by numeral 10, formed, for example, by any of the procedures noted above, is flame-sprayed as described above on opposite surfaces or sides with a zinc electrode indicated at 12, and with a silver electrode indicated at 14. Wires 16 and 18 connect the electrodes 12 and 14 respectively to a load 20.

Figure 2:
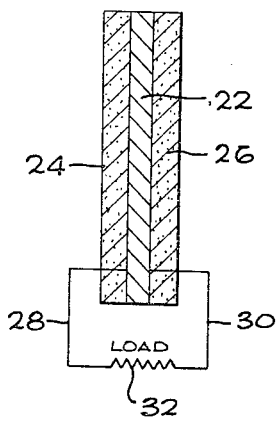
FIG. 2 is a schematic illustration of a modification of the battery unit of FIG. 1.

In the modification of FIG. 2, a hydrous oxide separator 22 is provided and has pressed against opposite sides thereof a zinc electrode 24 and a silver electrode 26.

Wires 28 and 30 connect the respective electrodes 24 and 26 of opposite polarity, in series to a load 32.

In the modification of FIG. 2, the zinc and silver electrodes are prepared in any suitable manner, e.g., by forming a paste of these electrode materials as described below and pressing the paste against, and causing it to adhere to and to impregnate, the opposite surfaces of the inorganic separator of the invention.

During discharge of the batteries illustrated in FIGS. 1 and 2, as is well known, the zinc is converted to zinc oxide and the silver oxide to silver, and during charging of such batteries the silver is oxidized to silver oxide and the zinc oxide is reduced to zinc. Because of these reversible reactions, the terms "silver" and "zinc," the terms "silver" and "cadmium" and the terms "nickel" and "cadmium," referring to the metals forming the respective electrodes of such battery systems, are intended to denote either the respective metals themselves or the corresponding oxides thereof.

The pores of the separator 10 or 22 are filled with an alkaline electrolyte. It will be noted in the schematic illustrations of FIGS. 1 and 2 that the separator aids in supporting the sprayed on metal electrodes 12 and 14, or the electrodes 24 and 26 pressed against opposite surfaces of the separator. However, certain electrodes, particularly the zinc electrode, even when so supported, slump and deteriorate, causing failure of the battery after a number of charge-discharge cycles.

By further supporting the electrodes, particularly the zinc electrode to minimize or substantially eliminate the slumping or collapse of the electrode, according to the invention described in the copending application Ser. No. 378,859, filed June 29, 1964 of Carl Berger and Frank C. Arrance, cycle life of the battery is substantially increased at temperatures of the order of 100° C., and efficiency of the battery is improved.

The following are examples of practice of the invention:

EXAMPLE 1

A hydrous zirconium oxide membrane having a porosity of about 15% is prepared as described in Example XXVII of the above copending application Ser. No. 326,985, by ball milling 450 grams of hydrous $ZrO_2$ with 450 grams concentrated phosphoric acid for 18 hours. This material is dried for 15 hours at 160° C., granulated to −32 and +80 mesh particles, and pressed into a 2" disc 0.20" thick, at 15 tons pressure and sintered at 300° C. for 24 hours. The homogeneous zirconium phosphate membrane thus formed is treated with a 30% solution of potassium hydroxide under conditions to draw the solution into the pores of the membrane by suction, converting the membrane to a hydrous zirconium oxide membrane.

Silver electrode material is prepared using equal parts of silver oxide and silver. These materials are mixed with a high speed vibrating mixer and pressed at 5 tons to about 15 tons total load into 2 inch diameter discs about 0.100 inch thick. The pressed discs are placed between flat smooth vitreous ceramic plates and sintered for one to four hours at temperatures ranging from 250° to 600° C. After cooling to room temperature, the sintered discs are cut to size and spot welded to a fine nickel screen.

The silver electrodes are prepared for use by electrolytic oxidation or charging at room temperature in 20% to 40% KOH. After forming, the electrode is removed from the charging stand and assembled in a battery as described below.

Zinc electrodes are prepared by mixing about 90 parts zinc oxide, 7 parts HgO, and 3 parts polyvinyl alcohol in a high speed vibratory mixer. After mixing, a weighed amount of this material is placed in an electrode compartment in contact with a fine nickel screen, mixed with a small amount of 30% KOH and electrolyzed.

Figure 3:
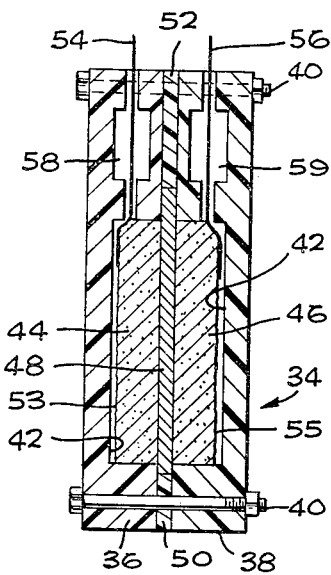
FIG. 3 shows the manner of assembly of a separator and electrodes to form a battery according to the invention.

The separator and electrodes described above are assembled to form a battery as shown in FIG. 3, employing a plastic case 34 formed of two symmetrical, e.g., Teflon, half portions 36 and 38 which are bolted together as indicated at 40. Compartments 36 and 38 of the case have recesses 42 formed therein to receive the zinc and silver electrodes 44 and 46 respectively, prepared as described above. The inorganic separator 48 is disposed centrally between the case portions 36 and 38 so that the electrodes 44 and 46 are pressed against opposite surfaces of such separator. Teflon spacers 50 and 52 are provided about the periphery of separator 48, to form a leakproof seal. Nickel screens 53 and 55 are embedded in electrodes 44 and 46 adjacent to the bottom of the compartment recesses 42, and silver terminal wires 54 and 56 are connected respectively to the screens 53 and 55, and are brought through the plastic electrode sections at the top of the assembly as shown. Small electrolyte reservoirs 58 and 59 are provided in the upper portion of the respective electrode compartments 36 and 38.

Figure 4:
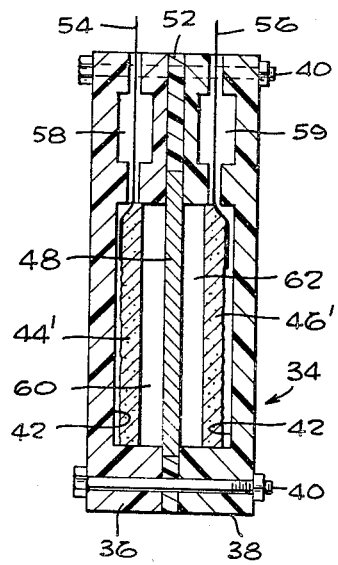
FIG. 4 shows a modification of the assembly of FIG. 3.

In the modification shown in FIG. 4, it will be noted that the zinc and silver electrodes 44' and 46' are spaced from and are not in direct contact with, the inorganic separator 48, forming captive electrolyte compartments 60 and 62 between such electrodes and separator 48, insuring a full supply of electrolyte filling the pores of the separator at all times.

Batteries of the types described above and illustrated in FIGS. 3 and 4, can be cycled for about 300 to about 500 half hour discharge and half hour charge cycles at 100° C.

However, where the electrodes are not in direct contact with the separator, as in the embodiment of FIG. 4, the battery often fails due to the slumping of the unsupported zinc electrode 44'.

If the electrodes are supported with respect to the separator, for example, if the electrodes are in direct contact with the separator, as illustrated in FIG. 3, so that the zinc electrode has less tendency to slump and break through the separator, a substantially larger number of charge and discharge cycles can be obtained. Furnishing support for the zinc electrode according to the above-noted Berger-Arrance application Ser. No. 378,859, provides improved results.

Discharge of such batteries over a period of days has resulted in current densities of 27 amperes per square foot at 1.2 volts and at ambient temperatures. Higher temperatures will improve the performance of the battery without deteriorating the hydrous zirconium oxide separator.

EXAMPLE 2

A hydrous titanium oxide membrane is prepared as described in Example XXVIII of the above copending application Ser. No. 326,985, by first dissolving 200 grams of titanium chloride in 500 cc. of water and precipitating titanium phosphate with a 1.0 M solution of phosphoric acid at a pH of 3. The precipitate is washed, dried for 24 hours at 110° C., granulated and pressed into a membrane 0.02 inch thick at 15 tons total load. The membrane is then sintered at 1,000° C. for 15 hours to form the pyrophosphate. The membrane thus formed is supported in a 10 liter autoclave containing 1 liter of water and subjected to steam at 2,300 p.s.i. and about 350° C. for 96 hours. The membrane is then treated with a 30% solution of potassium hydroxide drawn through the pores of the membrane by suction, forming a hydrous titanium oxide membrane. Such membrane has a porosity of about 12%.

This membrane is employed as a separator in the battery of Example 1 in place of the hydrous zirconium oxide separator thereof. Results similar to Example 1 are obtained.

EXAMPLE 3

A hydrous zirconium oxide membrane having a thickness of about 0.020 inch and a porosity of about 15% is obtained, as described in Example V of the above copending application, Ser. No. 327,114, by treating a flame-sprayed zirconia membrane in an autoclave containing 1 liter of water. The membrane is exposed therein to steam at 1,500 p.s.i. and approximately 315° C. for 650 hours.

The resulting hydrous zirconium oxide membrane is employed as a separator in the battery unit of Example 1 herein. Results similar to Example 1 are obtained.

EXAMPLE 4

A hydrous antimony oxide membrane having a thickness of about 0.02 inch is prepared, as described in Example VI of above copending application Ser. No. 327,114, by compacting and sintering antimony oxide at 500° C. and exposing the sintered membrane in an autoclave containing water, to steam at 2,000 p.s.i. and about 340° C. for 750 hours. The membrane so formed is employed as separator in the battery unit of Example 1 above, in place of the hydrous zirconium oxide separator, obtaining results similar to those in Example 1.

EXAMPLE 5

A hydrous tungstic oxide membrane about 0.02 inch thick is prepared according to Example IX of above copending application, Ser. No. 327,038, by compacting tungstic oxide and sintering at 1,000° C. The membrane is then treated in an autoclave with 30% sodium hydroxide solution and exposed therein to steam at 2,300 p.s.i. and about 350° C. for 350 hours.

The resulting membrane is employed as separator in the battery unit of Example 1 above in place of the anhydrous zirconium oxide membrane. A battery capable of operating over a large number of discharge-charge cycles at 100° C. is obtained.

EXAMPLE 6

A battery substantially the same as that of Example 1 is fabricated except that a separator is used which is formed as described in Example XIII of above copending application, Ser. No. 326,740. Such separator is produced by treating a flame-sprayed zirconia membrane that is flooded with water in a diffusion apparatus in which the flooded membrane is a divider between the two compartments thereof, one filled with a waterglass solution and the other with a 6.0 N solution of nitric acid and diffusion of the reagents into the membrane allowed to continue for 24 hours. After removal from the diffusion apparatus the pores of the membrane are filled with a hydrous gel of silicon dioxide.

A battery as in Example 1, employing such a separator in place of the hydrous zirconium oxide separator thereof is capable of operating for over 100 discharge-charge cycles of 30 minutes each at elevated temperatures.

EXAMPLE 7

A battery substantially the same as Example 1 is fabricated except that the separator employed therein is obtained as described in Example XIV of the above copending application, Ser. No. 326,740, by flooding a flame-sprayed zirconia membrane having a porosity of about 27% with water, and employing the flooded membrane as the divider between two compartments of a diffusion apparatus, one filled with a 2.0 M zirconyl nitrate solution and the other with a 6.0 M ammonium hydroxide solution. Diffusion of the reagents into the membrane is allowed to continue for 24 hours. After removal from the diffusion apparatus, the pores of the membrane are filled with a hydrous gel of zirconium oxide.

The battery containing such flame-sprayed zirconia membrane impregnated with a hydrous gel of zirconium oxide can operate for about 300 to about 500 discharge-charge cycles each of 30 minutes duration at temperature of 125° C.

EXAMPLE 8

A battery substantially similar to that of Example 1 is assembled, except that the electrodes are silver and cadmium.

Such battery can be cycled for about 1,000 to about 3,000 discharge-charge cycles at 100° C. without loss of effective capacity.

EXAMPLE 9

A battery substantially similar to that of Example 1 is assembled, except that the electrodes are nickel and cadmium.

Such a battery can be cycled for about 1,000 to about 3,000 discharge-charge cycles at 100° C. without loss of effective capacity.

EXAMPLE 10

The hydrous zirconium oxide membrane described in Example 1 above can function as an anion exchanger in a hydrazine-oxygen fuel cell.

EXAMPLE 11

A porous ceramic membrane 2" in diameter and 0.02 inch thick is prepared from scandium oxide, as described in Example II of above copending application Ser. No. 327,114, by compacting and sintering at 1,800° C. and 20 tons total load. The membrane is treated in an autoclave with water and superheated steam at 2,000 p.s.i. and about 340° C. for 750 hours, forming a hydrous scandium oxide membrane having a porosity of about 12%.

Such membrane is employed in the battery of Example 1 in place of the hydrous zirconium oxide separator thereof. Results similar to Example 1 are obtained.

EXAMPLE 12

A hydrous cerium oxide membrane having a thickness of about 0.02 inch and a porosity of about 15% is obtained as described in Example XII of the above copending application, Ser. No. 327,114 by compacting and sintering cerium oxide at 300° C. and treating the resulting membrane in an autoclave with water and steam at 2,300 p.s.i. and about 350° C. for 450 hours.

The resulting hydrous cerium oxide membrane is employed as a separator in the battery unit of Example 1 herein. Results similar to Example 1 are obtained.

EXAMPLE 13

A battery substantially the same as that of Example 1 is fabricated except that a separator is used which is formed as described in Example XVIII of above copending application Ser. No. 326,740. Such a separator is produced by flooding a flame-sprayed zirconia membrane with an aqueous solution of 1.0 M bismuth chloride containing 10% urea, and filling the pores of the membrane with the hydrous gel of bismuth oxide.

Such a battery can operate on the order of about 100 discharge-charge cycles of 30 minutes each at 100° C.

EXAMPLE 14

A battery substantially the same as that of Example 1 is fabricated except that a separator is used which is produced by impregnating the pores of a flame-sprayed zirconia membrane with a hydrous gel of vanadium oxide according to the procedure of above copending application Ser. No. 326,740.

The resulting battery can operate for a period of the order of about 100 discharge-charge cycles of 30 minutes each at 100° C.

EXAMPLE 15

A battery substantially similar to that of Example 1 is fabricated, except that in place of the separator of Example 1, a Teflon separator of substantially the same thickness is employed.

The Teflon is not readily wetted by the KOH electrolyte, causing the separator to have high resistance, and as a result the efficiency and capacity of the battery are substantially reduced. Such a battery runs for only about 25 discharge-charge cycles at 100° C. before battery failure occurs.

EXAMPLE 16

A hydrous zirconium oxided membrane prepared as in Example 1 above, but having a porosity of about 3%, is employed in a battery unit as described in Example 1. This battery has a capacity of only about 5 amperes per square foot as compared to the 27 amperes per square foot of the battery of Example 1.

EXAMPLE 17

A hydrous zirconium oxide membrane is prepared as in Example 1 above, but having a porosity of about 75%. This battery runs for only about 50 to about 75 discharge-charge cycles before failing, as compared to the substantially larger number of such cycles for the battery of Example 1.

From the foregoing, it is seen that the invention provides a high energy density battery embodying hydrous metal oxide membranes or separators having porous characteristics which prevent migration of electrode ions, such as silver and zinc ions through the separator to opposite electrodes, while permitting free transfer of hydroxyl ions through the separator. Such inorganic membranes permit substantially higher temperatures of operation of the order of 100° C. and above, without deterioration of these membranes as compared to prior art, e.g., organic separators, are resistant to oxidation by electrodes, e.g., silver oxide, and are radiation resistant. Batteries incorporating the separators of the invention are capable of being cycled through many discharge-charge cycles without any substantial loss of capacity. Such separators are of rigid, relatively inflexible structure, and are capable of supporting to some degree electrodes placed on opposite sides of the separator in contact therewith.

We are aware of U.S. Patent 1,863,070. The patent describes filters or diaphragms which can be employed for electrolytic purposes, by heating or sintering of chromium oxide together with other compounds which, on being heated, decompose, leaving pores, to thereby control or increase pore size of the chromium oxide body to obtain a high porosity membrane. It is stated in the patent that other heavy metal oxides such as zirconium oxide can also be used.

The hydrous metal oxide separators of the invention have advantages for use in batteries not possessed by the sintered oxides of the patent. Thus, for example, although the insoluble hydrous oxide separators of the invention are dielectric materials and have substantial internal resistance, their resistance in this respect is not nearly as high as that of the sintered inorganic oxides such as the sintered chromium oxide and the sintered zirconium oxide diaphragms of the patent, and thus, batteries embodying the hydrous oxide separators of the invention have substantially less internal resistance and are therefore more efficient than batteries employing the sintered chromium oxide and sintered zirconium oxide diaphragms of the patent. Further, the sintered metal oxide diaphragms of the above patent have a substantially greater porosity than the hydrous oxide separators of the invention and would result in batteries of substantially reduced cycle life and of low strength.

Moreover, hydrous metal oxides employed in the separators of the invention have ion exchange characteristics, which render such separators particularly suited for use in fuel cells as well as in batteries, whereas the sintered oxide diaphragms of the patent have no ion exchange properties.

It will be understood that the hydrous metal oxide separators of the invention can be employed in conjunction with any desired electrode system, including silver-zinc, silver-cadmium, nickel-cadmium, and the like.

While we have described particular embodiments of our invention for purposes of illustration, it will be understood that the invention is not to be taken as limited except by the scope of the appended claims.

We claim:
1. A battery comprising a pair of electrodes of opposite polarity and a porous separator between said electrodes for retaining electrolyte and permitting transfer of electrolyte ions, said separator consisting essentially of a porous insoluble hydrous inorganic oxide and said separator having a porosity permitting transfer of electrolyte ions through such separator, but preventing transfer of electrode ions therethrough.

2. A battery as defined in claim 1, said insoluble hydrous inorganic oxide being a porous insoluble hydrous metal oxide wherein said metallic element is selected from the group consisting of Al, Ga, In, Sc, Y, Zr, Ti, Hf, Pb, Si, Ge, Sn, Sb, Bi, As, V, Nb, Ta, Cr, Mo, W, Mn, Re, Tc, Fe, Co, Ni, Ac, Th, U, Pu, La, Ce and Yb, and said separator having a porosity in the range from about 5% to about 40%.

3. A battery comprising a pair of electrodes of opposite polarity and a porous rigid separator between said electrodes for retaining electrolyte and permitting transfer of electrolyte ions, said separator consisting essentially of a porous insoluble hydrous metal oxide and said separator having a porosity in the range from about 5% to about 40%.

4. A battery comprising a pair of electrodes of opposite polarity and a porous rigid separator between said electrodes for retaining electrolyte and permitting transfer of electrolyte ions, and an electrolyte in the pores of said separator, said electrodes being disposed in supported relation against opposite surfaces of said separator, said separator consisting essentially of a porous insoluble hydrous metal oxide and said separator having a porosity in the range from about 5% to about 40%.

5. A battery comprising a pair of electrodes of opposite polarity and a porous rigid separator between said electrodes for retaining electrolyte and permitting transfer of electrolyte ions, said separator consisting essentially of a porous insoluble hydrous metal oxide of a metal selected from the group consisting of zirconium, titanium, antimony, tungsten, silicon, scandium, bismuth, vanadium, aluminum and cerium, said hydrous oxide separator having a porosity in the range from about 5% to about 40%.

6. A battery comprising a pair of electrodes of opposite polarity and a porous separator between said electrodes for retaining electrolyte and permitting transfer of electrolyte ions, and an electrolyte in the pores of said separator, said separator being a rigid membrane consisting essentially of a porous insoluble hydrous metal oxide of a metal selected from the group consisting of zirconium, titanium, antimony, tungsten, silicon, scandium, bismuth, vanadium, aluminum and cerium, said hydrous oxide separator having a porosity in the range of about 10% to about 25%.

7. A battery comprising a pair of electrodes of opposite polarity and a porous separator between said electrodes for retaining electrolyte and permitting transfer of electrolyte ions, and an electrolyte in the pores of said separator, said separator being a rigid membrane consisting essentially of hydrous zirconium oxide and said separator having a porosity in the range from about 5% to about 40%.

8. A battery comprising a pair of electrodes of opposite polarity and a porous separator between said electrodes for retaining electrolyte and permitting transfer of electrolyte ions, said electrodes being disposed in supported relation against opposite surfaces of said separator, said separator being a rigid membrane consisting essentially of hydrous zirconium oxide and said separator having a porosity in the range from about 5% to about 40%.

9. A battery comprising zinc and silver electrodes and a porous rigid separator between said electrodes for retaining electrolyte and permitting transfer of electrolyte ions, said separator consisting essentially of a porous insoluble hydrous metal oxide of a metal selected from the group consisting of zirconium, titanium, antimony, tungsten, silicon, scandium, bismuth, vanadium, aluminum and cerium, said hydrous oxide separator having a porosity in the range from about 5% to about 40%.

10. A battery comprising zinc and silver electrodes and a porous separator between said electrodes for retaining electrolyte and permitting transfer of electrolyte ions, and an electrolyte in the pores of said separator, said separator being a strong rigid membrane consisting essentially of hydrous zirconium oxide and said separator having a porosity in the range from about 5% to about 40%.

11. A battery as defined in claim 10, wherein the porosity of said membrane ranges from about 10% to about 25%.

12. A battery comprising a pair of electrodes of opposite polarity and a porous separator between said electrodes for retaining electrolyte and permitting transfer of electrolyte ions, said separator being composed of a porous thin rigid inert plate, a gel of a porous insoluble hydrous inorganic oxide filling the pores of said plate, and said separator having a porosity permitting transfer of electrolyte ions through such separator, but preventing transfer of electrode ions therethrough.

13. A battery comprising a pair of electrodes of opposite polarity and a porous separator between said electrodes for retaining electrolyte and permitting transfer of electrolyte ions, said separator being composed of a porous thin rigid inert ceramic plate, a gel of hydrous zirconium oxide filling the pores of said plate, and said separator having a porosity in the range from about 5% to about 40%.

14. A battery comprising a pair of electrodes of opposite polarity and a porous separator between said electrodes for retaining electrolyte and permitting transfer of electrolyte ions, said separator being composed of a porous flame-sprayed rigid inert zirconia membrane, a gel of hydrous zirconium oxide filling the pores of said membrane and said separator having a porosity in the range from about 5% to about 40%.

References Cited

UNITED STATES PATENTS

| | | | |
|---|---|---|---|
| 483,692 | 10/1892 | Lehman | 136—142 |
| 2,422,045 | 6/1947 | Ruben | 136—154 |
| 2,698,305 | 12/1954 | Plank et al. | 252—317 |
| 3,056,647 | 10/1962 | Amphlett | 136—153 |
| 3,147,149 | 9/1964 | Postal | 136—163 |
| 3,276,910 | 10/1966 | Grasselli et al. | 136—86 |
| 3,257,239 | 6/1966 | Shultz et al. | 136—86 |
| 3,266,940 | 8/1966 | Caesar | 136—86 |

WINSTON A. DOUGLAS, Primary Examiner

DONALD L. WALTON, Assistant Examiner

U.S. Cl. X.R.

136—146, 153